US012492312B2

(12) United States Patent
Tai et al.

(10) Patent No.: US 12,492,312 B2
(45) Date of Patent: Dec. 9, 2025

(54) AQUEOUS ANTI-CORROSIVE PAINT CONTAINING IONIZED WATER AND METHOD FOR MANUFACTURING THEREOF

(71) Applicant: Jeong Ok Park, Yongin-si (KR)

(72) Inventors: Weon Pil Tai, Ulsan (KR); Jeong Ok Park, Yongin-si (KR)

(*) Notice: Subject to any disclaimer, the term of this patent is extended or adjusted under 35 U.S.C. 154(b) by 338 days.

(21) Appl. No.: 18/219,139

(22) Filed: Jul. 7, 2023

(65) Prior Publication Data

US 2024/0150588 A1    May 9, 2024

(30) Foreign Application Priority Data

Nov. 4, 2022   (KR) .................. 10-2022-0146265

(51) Int. Cl.
*C09D 5/10*   (2006.01)
*C09D 7/45*   (2018.01)
*C09D 7/47*   (2018.01)
*C09D 7/61*   (2018.01)

(52) U.S. Cl.
CPC .............. *C09D 5/106* (2013.01); *C09D 7/45* (2018.01); *C09D 7/47* (2018.01); *C09D 7/61* (2018.01)

(58) Field of Classification Search
CPC . C09D 5/106; C09D 7/45; C09D 7/47; C09D 7/61; C09D 1/02; C09D 5/082; C09D 7/20; C09D 7/70
See application file for complete search history.

(56) References Cited

U.S. PATENT DOCUMENTS

2009/0238811 A1* 9/2009 McDaniel ............... A61L 2/00
                                                        424/94.2

FOREIGN PATENT DOCUMENTS

| CN | 107207886 B  | * | 2/2021  | ........... C09D 11/322 |
|----|--------------|---|---------|-------------------------|
| JP | 2002053769 A | * | 2/2002  |                         |
| JP | 4846118 B2   | * | 12/2011 |                         |
| KR | 10-1797116 B1|   | 11/2017 |                         |
| KR | 10-2018-0032368 A |   | 3/2018 |                    |
| KR | 10-2018-0103582 A |   | 9/2018 |                    |
| TW | 202108659 A  | * | 3/2021  |                         |

OTHER PUBLICATIONS

JP4846118B2 Mach Translation (Year: 2011).*
CN107027886B mach translation (Year: 2021).*
JP 2002053769 A Machine Translation (Year: 2002).*
JP 4846118B2 Machine Translation (Year: 2011).*
TW-202108659A Machine Translation (Year: 2021).*

* cited by examiner

*Primary Examiner* — Pamela H Weiss

(57) ABSTRACT

The present disclosure relates to an aqueous anti-corrosive paint containing ionized water, and the paint includes a main agent including zinc flakes and a curing agent for curing the main agent, including a silicate-based binder, in which the main agent and the curing agent contain ionized water.

9 Claims, 5 Drawing Sheets

AQUEOUS ANTI-CORROSIVE PAINT CONTAINING IONIZED WATER AND METHOD FOR MANUFACTURING THEREOF

The present application claims priority to Korean Patent Application No. 10-2022-0146265, filed Nov. 4, 2022, the entire contents of which is incorporated herein for all purposes by this reference.

BACKGROUND OF THE INVENTION

1. Field of the Invention

The present disclosure relates to an aqueous anti-corrosive paint effective in preventing rust and corrosion that can often occur on a metal surface, and more particularly, to an aqueous anti-corrosive paint using zinc flakes and ionized water and a manufacturing method thereof.

2. Description of the Related Art

Corrosion is the oxidation of metals and is a common example of iron corrosion in everyday life. Anti-corrosion is to prevent such corrosion and is usually accomplished by applying a rust-resistant coating to the metal's surface. This is usually done by applying paint or rust inhibitors or by plating a highly corrosive metal, which is the principle of self-sacrificial corrosion, in which a more corrosive metal is applied instead of the metal being protected. In the case of iron (Fe), zinc or aluminum, both of which have a relatively high degree of ionization, are commonly used.

Zinc flake coating is a technique in which eccentric zinc flakes are bonded to the metal surface with the help of a binder to form a thin zinc layer. In general, a pretreatment such as a phosphate film is performed to improve the adhesion of zinc powder, and a top coat is added to strengthen corrosion resistance and adjust the friction coefficient after a base coat for rust prevention. In the case of anti-corrosive coating using conventional zinc powder, as shown in FIG. 1, the particles are relatively large, and the space between the particles is wide, which reduces the anti-corrosion effect, and the thickness of the coating is relatively thick, which also reduces the weldability.

Another conventional flake zinc coating is disclosed in patent Literature 1. Patent Literature 1 relates to a moisture-curable anti-corrosive coating composition using a flat zinc roll, more specifically, the composition includes 10% to 30% by weight of a flake zinc powder, 30% to 60% by weight of a diphenylmethane diisocyanate based prepolymer, 1% to 10% by weight of zinc phosphate ($Zn_3(PO_4)_2$), 1% to 5% by weight of p-toluenesulfonyl isocyanate, 1% to 5% by weight of triethyl orthoformiate, and 10% to 40% by weight of solvent.

However, conventional coating agents using zinc flakes are highly toxic as organic solvents such as aromatic hydrocarbons and esters are used as solvents, which is not good for the environment and may cause health problems for workers due to long-term use. In addition, there is also the problem that the thickness of the coating film is relatively thick, such as about 40 to 50 μm, resulting in poor weldability.

LITERATURES OF THE RELATED ART

Patent Literature (Patent literature 1) KR 10-1797116 B1 (Nov. 7, 2017)

SUMMARY OF THE INVENTION

The present disclosure is designed to solve the above problems, and the problem to be solved in the present disclosure is to provide an aqueous anti-corrosive paint, including ionic water, that can maintain excellent anti-corrosive properties while utilizing a solvent of eco-friendly materials and keeping the thickness of the paint film thin to improve weldability, and a manufacturing method including the same.

An aqueous anti-corrosive paint containing ionized water, according to the present disclosure for solving the above problems, includes a main agent including zinc flakes; and a curing agent including a silicate-based binder for curing the main material, in which the main material and the curing agent include ionized water.

In addition, the main agent of the present disclosure for solving the above problems is configured to further include a water-soluble additive, and the additive includes a dispersing agent, a leveling agent, an anti-settling agent, and an antifoaming agent.

In addition, the main agent of the present disclosure for solving the above problems is configured to further include 20% to 50% by weight of the zinc flake, 40% to 60% by weight of the ionized water, 0.3% to 1.3% by weight of the dispersing agent, 0.3% to 1% by weight of the leveling agent, 0.5% to 3.5% by weight of the anti-settling agent, and 0.1% to 1% by weight of the antifoaming agent.

In addition, the curing agent of the present disclosure for solving the above problems is configured to include 30% to 80% by weight of the silicate-based binder and 30% to 60% by weight of the ionized water.

In addition, the silicate-based binder of the present disclosure for solving the above problems is at least one selected from the group consisting of sodium silicate, potassium silicate, and lithium silicate.

In addition, the main agent of the present disclosure for solving the above problems is configured to further include a rust-preventive pigment and the rust-preventive pigment is included in an amount of 0.1% to 20% by weight.

In addition, the ratio of the main agent and the curing agent of the present disclosure for solving the above problems is 1:0.4 to 1:1 based on the weight ratio.

In addition, the thickness of the zinc flake of the present disclosure for solving the above problems is in a range of 0.2 to 0.4 μm, and the length is in a range of 13 to 17 μm.

In addition, the ionized water of the present disclosure for solving the above problems has a pH of 12 to 14.

In addition, the method for manufacturing an aqueous anti-corrosive paint containing ionized water according to the present disclosure for solving the above problems includes: a first step of preparing an additive solution by adding a water-soluble additive to ionized water and then stirring; a second step of preparing a main agent by adding zinc flakes to the additive solution and then stirring; and a third step of preparing a curing agent by adding a silicate-based binder to ionized water and then stirring.

The aqueous anti-corrosive paint containing ionized water, according to the present disclosure, can improve workability and weldability by reducing the thickness of the paint film by reducing the zinc content by utilizing flake zinc and can increase price competitiveness by eliminating the need for environmental facilities for burning organic solvents. In addition, the use of ionized water is more environmentally friendly than paints using organic solvents, and workers have the advantage of reducing the possibility of inhaling toxic substances during work.

DESCRIPTION OF THE PREFERRED EMBODIMENTS

Hereinbelow, the present disclosure will be described in detail with reference to the accompanying drawings. The present disclosure may be embodied in many forms and may have various embodiments. Thus, specific embodiments will be illustrated in the accompanying drawings and described in detail below. While specific embodiments of the disclosure will be described herein below, they are only illustrative purposes and should not be construed as limiting to the present disclosure. Accordingly, the present disclosure should be construed to cover not only the specific embodiments but also cover all modifications, equivalents, and substitutions that fall within the spirit and technical scope of the present disclosure.

The terms used herein are used only to describe specific embodiments, and are not intended to limit the present disclosure. As used herein, the singular forms "a", "an", and "the" are intended to include the plural forms as well unless the context clearly indicates otherwise. In this application, the terms "comprising" or "consisting of" are intended to designate the presence of the features, steps, components, or combinations thereof described in the specification and are not to be understood as precluding the possibility of the presence or addition of one or more other features, steps, components, or combinations thereof.

Unless otherwise defined, all terms used herein, including technical or scientific terms, shall have the same meaning as commonly understood by one of ordinary skill in the art to which this disclosure belongs.

As used herein, the term "shop primer" refers to a primary anti-corrosive coating for preventing rust on steel structures used in the field of construction, such as ships, bridges, tanks, and plants. Since these steel structures are exposed to external environments such as the ocean or construction sites and are prone to rust, a shop primer coating is applied to the surface of the steel structure before assembly, and then processing or assembly is performed. Of course, shop primers are not limited to steel structures used in dry construction and can be used on steel structures used in any application that requires rust prevention.

Figure 2:
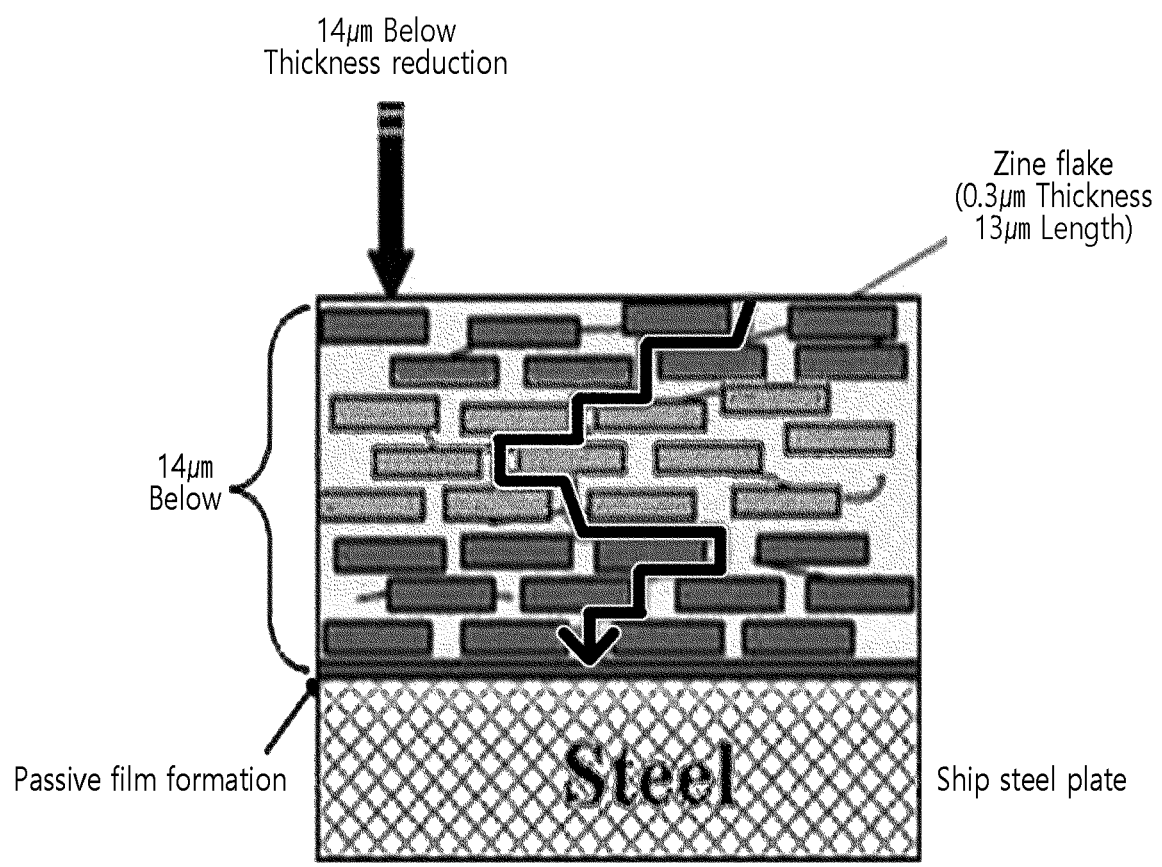
FIG. 2 is a schematic diagram showing a cross-section of a coated film using an aqueous anti-corrosive paint containing ionized water according to the present disclosure.
Figure 3:
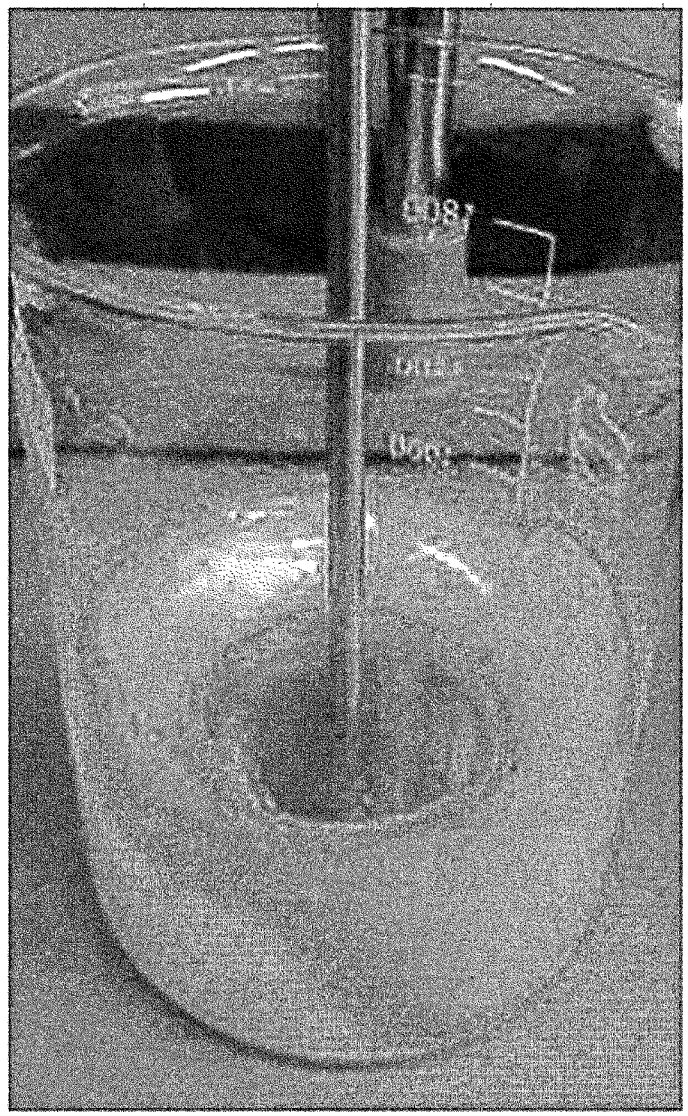
FIGS. 3 to 4 show a process for preparing the main agent of the present disclosure.
Figure 4:
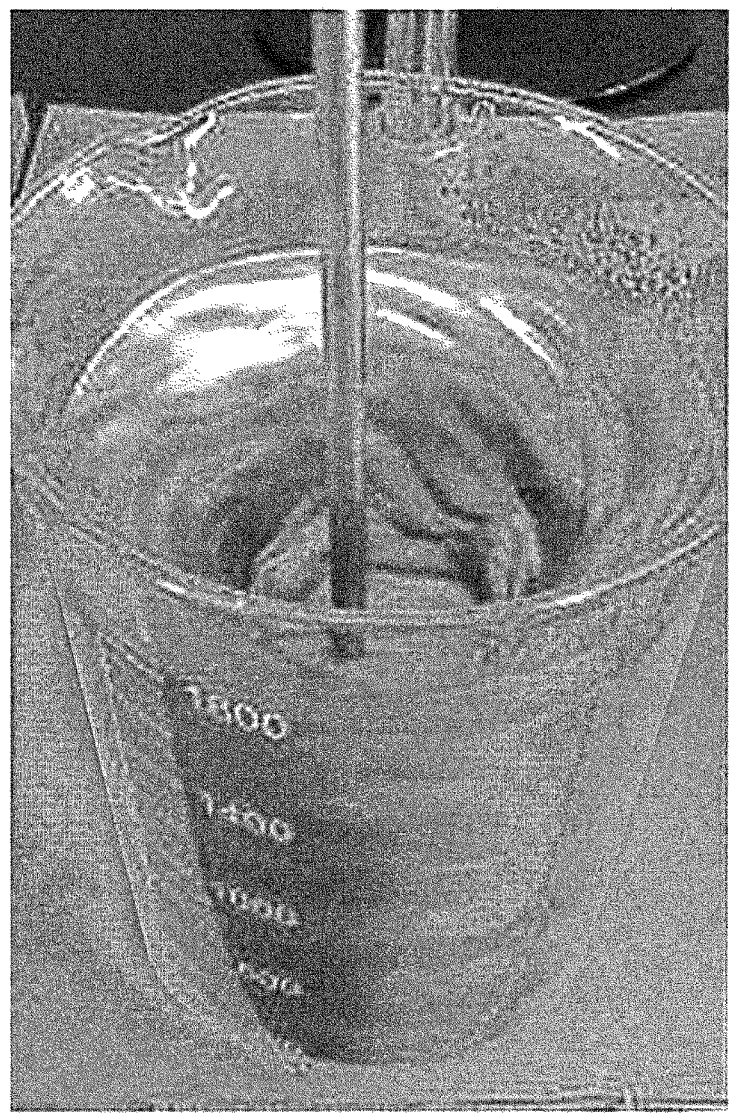
Figure 5:
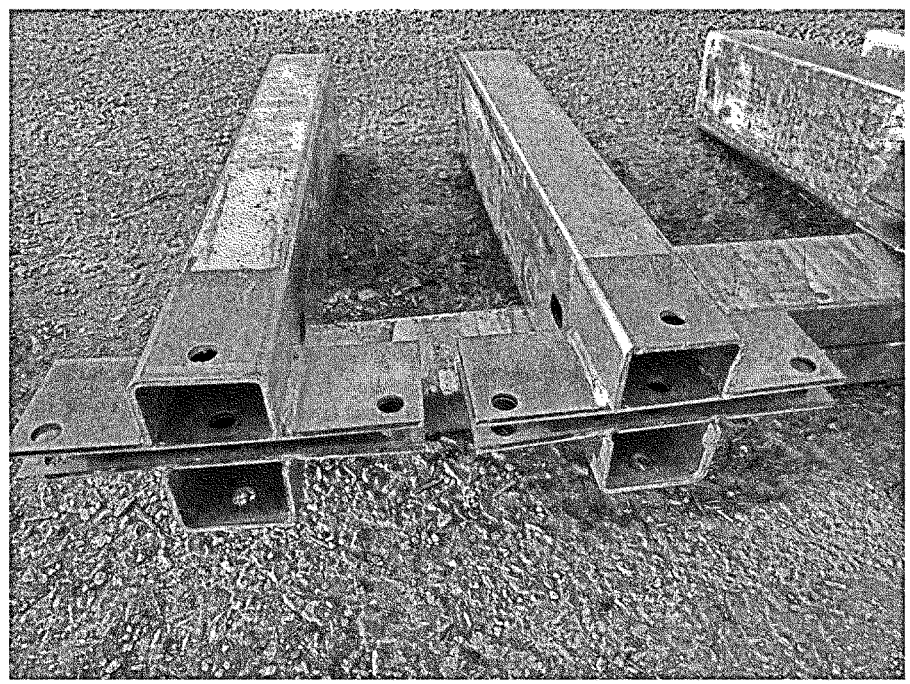
FIG. 5 shows an example of actually applying the aqueous anti-corrosive paint to a metal member, according to the present disclosure.

The aqueous anti-corrosive paint containing ionized water according to the present disclosure may be used as a material for a shop primer. In this case, it is desirable to set the thickness of the coating film to 14 μm or less to facilitate weldability, and in particular, the coating, according to the present disclosure, has the advantage of setting the thickness to 14 μm or less while maintaining excellent anti-corrosion properties by utilizing zinc flakes having a thickness of 0.3 μm as shown in FIG. 2.

As used in this specification, the term "weldability" refers to the property of a metal material to be welded, i.e., the degree to which a satisfactory joint is obtained when the base metal is welded by any method, and the welded joint satisfies the intended use of the structure. Generally, weldability means both bonding and welding performance.

As used herein, the term "corrosive" means to prevent the chemical attack on a material. It can be used interchangeably with "anti-corrosion".

The term "coated film" used herein means a film formed by applying a paint.

In one embodiment of the present disclosure, the zinc flake is a powder, and as shown in FIG. 2, the average thickness is 0.3 μm, and the length is 13 μm to 17 μm or less. Zinc flakes have a flake shape with a large specific surface area, so that rust prevention performance can be maximized. Zinc flake powder may include MF-ZF from Metalface Co., but is not limited thereto.

Ionic water is a substance that inhibits corrosion of a material by forming a passive film on the metal to be coated, breaking the electrochemical circuit of corrosion, and serves to disperse zinc flakes and additives. The ionized water contains one or more elements in the ionized state element selected from Si, Ca, K, Fe, Mn, Ti, Na, P, S, I, Mu, V, Cu, Co, Cr, and Sr.

The ionized water, according to the present disclosure, preferably has a pH in the range of 12 to 14. The inventors of the present application found that the lower the pH of the ionized water, the more similar it is to the properties of ordinary water molecules and that the pH should be at least 12 to have an anti-rust effect on the paint.

An anti-corrosive pigment is a substance that inhibits the corrosion of a metal object by forming a passive film inside a coating applied to the object and breaking the electrochemical circuit of corrosion.

In one embodiment of the present disclosure, the anti-corrosive pigment can be a non-toxic anti-corrosive pigment, such as a silicate-based compound, a phosphate-based compound, a calcium ion exchange silicon oxide-based compound, or the like. For example, strontium phosphosilicate, calcium borosilicate zinc phosphate, strontium zinc phosphosilicate, zinc aluminum phosphate, calcium phosphate, calcium ion exchange silica, and the like can be used as anti-corrosive pigments, and they can be used alone or in a mixture of two or more types.

The main agent may further contain additives. The additive improves fluidity so that the zinc flake powder can be effectively and uniformly dispersed in the coating agent and prevents gelation of the main agent by preventing precipitation. Specifically, the additives include a dispersing agent, a leveling agent, an anti-settling agent, and an antifoaming agent, and those commonly used in the paint field may be used.

The dispersing agent is adsorbed on the surface of the zinc flake powder to prevent re-agglomeration of the zinc flake powder due to the steric hindrance effect and electrostatic repulsive force, thereby improving the fluidity of the coating agent. The dispersing agent is preferably added in the range of 0.3% to 1.3% by weight based on 100% by weight of the total main agent.

The leveling agent serves to improve the difference in surface tension by being distributed on the surface of the coating film. The leveling agent is preferably added in the range of 0.3% to 1% by weight based on 100% by weight of the total main agent.

The anti-settling agent is preferably a material capable of suppressing sedimentation with a fluidity modifier and improving its storage stability or a material capable of improving the anti-sagging properties of the coating composition during or after coating. The anti-settling agent is preferably added in the range of 0.5% to 3.5% by weight based on 100% by weight of the total main agent.

The antifoaming agent is preferably a material capable of lifting air bubbles to the surface in a liquid or suppressing the generation of air bubbles during the production or painting of the present composition or a material capable of breaking air bubbles generated in the present composition. The antifoaming agent is preferably added in the range of 0.1% to 1% by weight based on 100% by weight of the total main agent.

The curing agent serves to crosslink the main agent to act as a hard coating. The curing agent is constituted by including a silicate-based binder as a binder.

The silicate-based binder may have a $SiO_2$ content of 18% to 30% by weight. Specifically, the silicate-based binder may include at least one of sodium silicate, potassium silicate, and lithium silicate.

In one embodiment of the present disclosure, the silicate-based binder is preferably added in the range of 30% to 80% by weight based on 100% by weight of the total curing agent. When the content of the silicate-based binder is less than 30% by weight, the adhesion is weakened and the paint of the present disclosure is likely to be removed from the metal to be coated, and the durability is also weakened and the rust prevention effect is significantly reduced.

In one embodiment of the present disclosure, the weight ratio of the main agent and the curing agent may be 1:0.4 to 1:1. When the ratio of the curing agent is less than 0.4, there is a problem in that the adhesion of the coating film is lowered and the anti-corrosive performance and weldability are reduced, and when the ratio of the curing agent exceeds 1, there is a problem in that the coating film is cracked and broken.

A method for manufacturing an aqueous anti-corrosive paint containing ionized water, according to the present disclosure, includes: a first step of preparing an additive solution by adding water-soluble additives to ionized water and then stirring; a second step of preparing a main agent by adding zinc flakes to the additive solution and then stirring; and a third step of preparing a curing agent by adding a silicate-based binder to ionized water and then stirring.

Hereinafter, the aqueous anti-corrosive paint containing ionized water, according to the present disclosure, will be described in more detail through examples.

Figure 1:
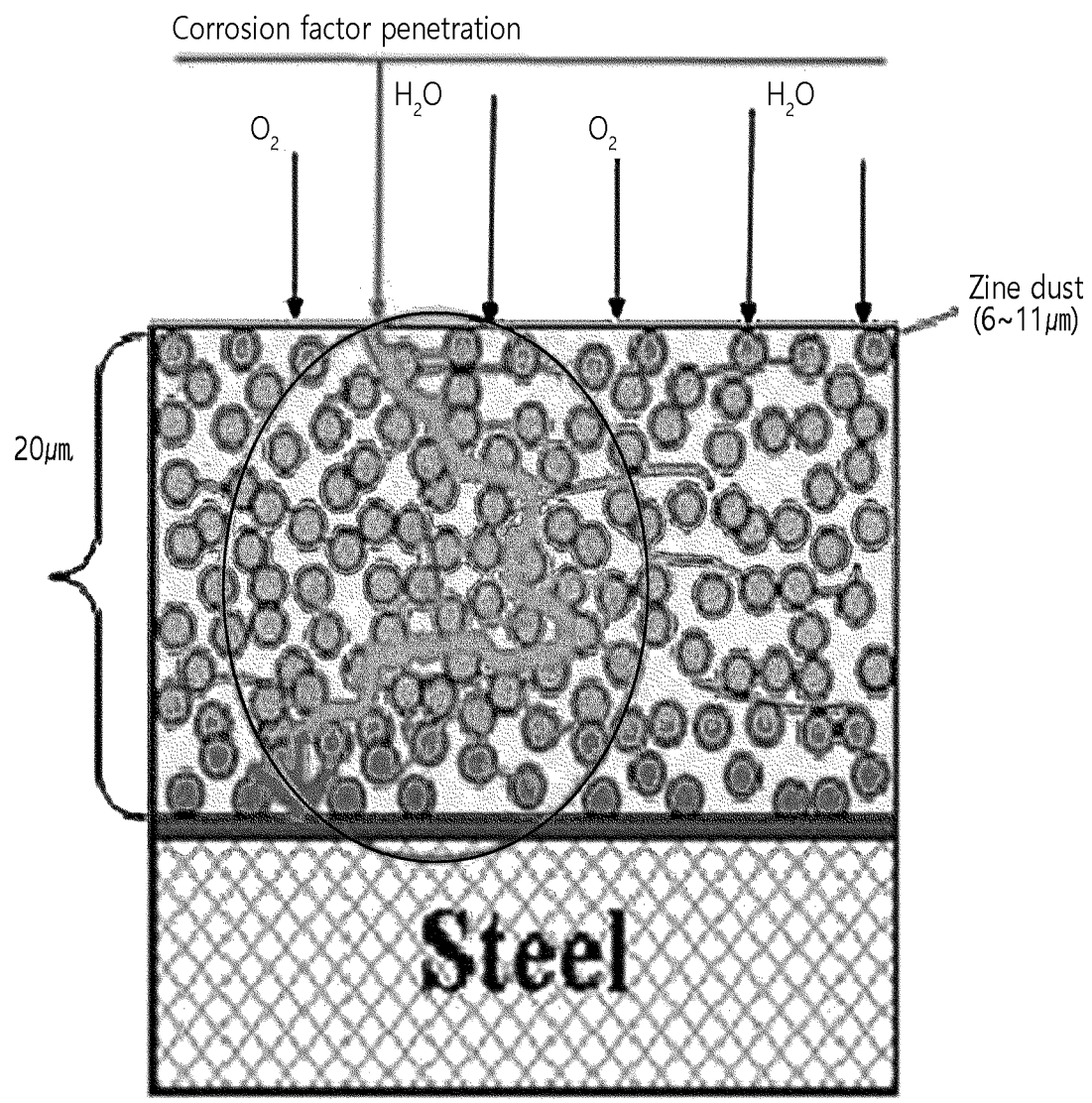
FIG. 1 is a schematic diagram showing a cross-section of a coated film using a conventional anti-corrosive paint.

Example 1. Manufacture of Aqueous Anti-Corrosive Paint 1-1. Method of Preparing the Main Agent Ionized water was added to the container, and additives such as dispersing agent, leveling agent, anti-settling agent, and antifoaming agent were added in order, stirred at 500 rpm, and then stirred and mixed at 1000 rpm for 30 minutes to prepare the additive solution (see FIG. 1). Next, zinc flake powder and inorganic antirust pigment were added in order and stirred at 500 rpm for 30 min to prepare one-component (see FIG. 2) and two-component (zinc flake, additive solution, each) main agents.

1-2. Method of Preparing Curing Agent

Ionized water and a thickener were added to a container, stirred, and dispersed, and a silicate-based binder was added to prepare a curing agent by stirring and mixing at 500 rpm for 30 minutes.

The above main agent and the curing agent were mixed to prepare an aqueous anti-corrosive paint composition as shown in the embodiment of Table 1.

In the above method, aqueous anti-corrosive paints were prepared with the following compositions.

1-3. First Implementation (Main Agent:Binder=1:1)

Main agent: 20% by weight of zinc flake, 57.5% by weight of ionized water, 20% by weight of anti-corrosive pigment, 0.5% by weight of dispersing agent, 0.5% by weight of leveling agent, 0.5% by weight of antifoaming agent, 1% by weight of anti-settling agent, binder: 50% by weight, 50% by weight of ionized water.

1-4. Second Implementation (Main Agent:Binder=1:1)

Main agent: 26% by weight of zinc flake, 56.5% by weight of ionized water, 15% by weight of anti-corrosive pigment, 0.5% by weight of dispersing agent, 0.5% by weight of leveling agent, 0.5% by weight of antifoaming agent, 1% by weight of anti-settling agent, binder: 50% by weight, 50% by weight of ionized water.

1-5. Third Implementation (Main Agent:Binder=1:0.5)

Main agent: 33% by weight of zinc flake, 54.5% by weight of ionized water, 10% by weight of anti-corrosive pigment, 0.5% by weight of dispersing agent, 0.5% by weight of leveling agent, 0.5% by weight of antifoaming agent, 1% by weight of anti-settling agent, binder: 25% by weight, 25% by weight of ionized water.

1-6. Fourth Implementation (Main Agent:Binder=1:0.5)

Main agent: 36% by weight of zinc flake, 51% by weight of ionized water, 10% by weight of anti-corrosive pigment, 0.5% by weight of dispersing agent, 0.5% by weight of leveling agent, 0.5% by weight of antifoaming agent, 1.5% by weight of anti-settling agent, binder: 30% by weight, 20% by weight of ionized water.

1-7. Fifth Implementation (Main Agent:Binder=1:0.5)

Main agent: 38% by weight of zinc flake, 49% by weight of ionized water, 10% by weight of anti-corrosive pigment, 0.5% by weight of dispersing agent, 0.5% by weight of leveling agent, 0.5% by weight of antifoaming agent, 1.5% by weight of anti-settling agent, binder: 35% by weight, 15% by weight of ionized water.

1-8. Sixth Implementation (Main Agent:Binder=1:0.5)

Main agent: 43% by weight of zinc flake, 49% by weight of ionized water, 5% by weight of anti-corrosive pigment, 0.6% by weight of dispersing agent, 0.5% by weight of leveling agent, 0.6% by weight of antifoaming agent, 1.3% by weight of anti-settling agent, binder: 40% by weight, ionized water 9.8% by weight, thickener 0.2% by weight.

1-9. Seventh Implementation (Main Agent:Binder=1:0.5)

Main agent: 45% by weight of zinc flake, 51.8% by weight of ionized water, 0.6% by weight of dispersing agent, 0.7% by weight of antifoaming agent, 1.3% by weight of anti-settling agent, binder: 51.5% by weight, ionized water 9.8% by weight, thickener 0.2% by weight.

1-10. Eighth Implementation (Main Agent:Binder=1:0.5)

Main agent: 48% by weight of zinc flake, 48.8% by weight of ionized water, 0.6% by weight of dispersing agent, 0.6% by weight of leveling agent, 0.7% by weight of antifoaming agent, 1.3% by weight of anti-settling agent, binder: 48.5% by weight, ionized water 9.8% by weight, thickener 0.2% by weight.

The composition of each implementation is summarized in Table 1.

TABLE 1

| Division | 1st Example | 2nd Example | 3rd Example | 4th Example | 5th Example | 6th Example | 7th Example | 8th Example |
|---|---|---|---|---|---|---|---|---|
| Zinc Flakes | 20 | 26 | 33 | 36 | 38 | 43 | 45 | 48 |
| Ionized water | 57.5 | 56.5 | 54.5 | 51 | 49 | 49 | 51.8 | 48.8 |
| Anti-corrosive pigment | 20 | 15 | 10 | 10 | 10 | 5 | — | — |
| Dispersing agent | 0.5 | 0.5 | 0.5 | 0.5 | 0.5 | 0.6 | 0.6 | 0.6 |
| Leveling agent | 0.5 | 0.5 | 0.5 | 0.5 | 0.5 | 0.5 | 0.6 | 0.6 |
| Antifoaming agent | 0.5 | 0.5 | 0.5 | 0.5 | 0.5 | 0.6 | 0.7 | 0.6 |
| Anti-settling agent | 1 | 1 | 1 | 1.5 | 1.5 | 1.3 | 1.3 | 1.3 |
| Sum of main agent | 100 | 100 | 100 | 100 | 100 | 100 | 100 | 100 |
| binder | 50 | 50 | 25 | 30 | 35 | 40 | 40 | 40 |
| Ionized water | 50 | 50 | 25 | 20 | 15 | 9.8 | 9.8 | 9.8 |
| Thickener | — | — | — | — | — | 0.2 | 0.2 | 0.2 |
| Sum of binder | 100 | 100 | 50 | 50 | 50 | 50 | 50 | 50 |

Example 2. Property Evaluation

After shop blasting or sandblasting was pretreated on a steel plate with a length of 300 mm, a width of 100 mm, and a thickness of 3.2 mm, the aqueous anti-corrosive paint prepared in each example was applied by airless spraying, brushing, or dipping. The dry film thickness of one coat was 7 to 15 μm and was dried for at least 3 hours at a temperature of 25±5° C. and a relative humidity of 50±20%.

After evaluating the physical properties of the coated film formed on the steel sheet by the following evaluation methods, the results are shown in Table 2 below.

(1) Anti-Corrosion Property

As a test method for anti-corrosion, a salt spray test based on ASTM B117-03 was used to measure the anti-corrosion performance with the naked eye of the time for rust to occur on the coated specimen.

(2) Adhesiveness

The test method for adhesion performance was measured according to ASTM D3359.

(3) Weldability

The test method for welding performance was performed by fillet welding the coated steel sheet in accordance with ASME BPVC Sec.XI:2021 (QW-182), and the destructive test was performed to visually measure the number of weld pores in units of pieces/m.

(4) Impact Resistance

The test method for impact resistance is based on ISO 6272-1, which uses a DuPont-type impact tester to drop a weight of arbitrary height and load onto the film, and measure the abnormality of the film surface.

(5) Storage Stability

The storage stability test method measured the stability of the paint in the container after 1 week after mixing the main agent and the curing agent in accordance with ASTM D1849-95. When there was no abnormality, a state in which gelation was not performed, and easy to redisperse or use was judged as clear.

TABLE 2

| Class | 1st Example | 2nd Example | 3rd Example | 4th Example | 5th Example | 6th Example | 7th Example | 8th Example |
|---|---|---|---|---|---|---|---|---|
| Anti-corrosion property | — | — | >200 h | >220 h | >230 h | >240 h | >240 h | >240 h |
| Adhesiveness | 2nd level | 2nd level | 3rd level | 3rd level | 4th level | 4th level | 4th level | 4th level |
| Weldability | 13 | 13 | 13 | 13 | 13 | 13 | 14 | 14 |
| Impact resistance | Clear | Clear | Clear | Clear | Clear | Clear | Clear | Clear |
| Storage stability | Clear | Clear | Clear | Clear | Clear | Clear | Clear | Clear |

As shown in Table 2, all of the aqueous anti-corrosive paints exhibited excellent anti-corrosion properties and strong adhesion and weldability. In addition, since the aqueous anti-corrosive paints of all implementations have an additive content of 5% by weight or less and a zinc flake content of 50% by weight or less based on the main agent, zinc is uniformly applied to the surface of the steel sheet, thereby maintaining anti-corrosion and weldability at an excellent level.

Hereinafter, an embodiment of an aqueous anti-corrosive paint containing ionized water according to the present disclosure will be described.

The aqueous anti-corrosive paint, according to the present disclosure, can be used as a temporary anti-corrosive paint composition for steel structures. For example, the aqueous anti-corrosive paint composition can be used as a shop primer for block-building steel plates used in shipyards and as an anti-corrosive paint for structural steel plates.

Furthermore, the aqueous anti-corrosive paint, according to the present disclosure, can be applied to a steel structure by air spraying, airless spraying, brushing, dipping, and the like, and dried to form a coated film.

On the other hand, the aqueous anti-corrosive paint containing ionized water, according to the present disclosure, can be implemented in three main forms, including one-component, two-component, and three-component types. The one-component type is provided in a state in which the main agent and the curing agent are included together. In the two-component type, the main agent and the curing agent are separately provided, and in the three-component type, the zinc flake, the additive, and the curing agent are separately provided. Therefore, the two-component type and the three-component type are used after mixing before applying to the coating target.

This invention was supported by the Ministry of SMEs and Startups (MSS) of Republic of Korea, under the Development of eco-friendly water-based coating agent based on ionized water for ship structures research project (Project No. S3258682) supervised by the Korea Technology and Information Promotion Agency for SMEs (TIPA).

What is claimed is:

1. An aqueous anti-corrosive paint containing ionized water, the paint comprising:
    a main agent comprising zinc flakes; and
    a curing agent for curing the main agent, the curing agent comprising a silicate-based binder,
    wherein the main agent and the curing agent contain ionized water.

2. The paint of claim 1, wherein the main agent further comprises a water-soluble additive,
    the additive comprises a dispersing agent, a leveling agent, an anti-settling agent, and an antifoaming agent.

3. The paint of claim 2, wherein the main agent comprises 20% to 50% by weight of the zinc flakes, 40% to 60% by weight of the ionized water, 0.3% to 1.3% by weight of the dispersing agent, 0.3% to 1% by weight of the leveling agent, 0.5% to 3.5% by weight of the anti-settling agent, and 0.1% to 1% by weight of the antifoaming agent.

4. The paint of claim 3, wherein the curing agent comprises 30% to 80% by weight of the silicate-based binder and 30% to 60% by weight of the ionized water, and
    the silicate-based binder is at least one selected from among sodium silicate, potassium silicate, and lithium silicate.

5. The paint of claim 3, wherein the main agent further comprises an anti-corrosive pigment, and
    the anti-corrosive pigment is comprised in an amount of 0.1% to 20% by weight.

6. The paint of claim 1, wherein the weight ratio of the main agent and the curing agent is in a range of 1:0.4 to 1:1, and
    the zinc flake has a thickness in a range of 0.2 to 0.4 µm and a length in a range of 13 to 17 µm.

7. The paint of claim 1, wherein the ionized water has a pH value in a range of 12 to 14.

8. A method of preparing an aqueous anti-corrosive paint containing ionized water, the method comprising:
    a first step of preparing an additive solution by adding a water-soluble additive to ionized water and then stirring;
    a second step of preparing a main agent by adding zinc flakes to the additive solution and then stirring; and
    a third step of preparing a curing agent by adding a silicate-based binder to ionized water and then stirring.

9. The method of claim 8, wherein the additive comprises a dispersing agent, a leveling agent, an anti-settling agent, and an antifoaming agent, and
    the main agent comprises 20% to 50% by weight of the zinc flake, 40% to 60% by weight of the ionized water, 0.3% to 1.3% by weight of the dispersing agent, 0.3% to 1% by weight of the leveling agent, 0.5% to 3% by weight of the anti-settling agent, and 0.1% to 1% by weight of the antifoaming agent.

* * * * *